Feb. 10, 1953 W. H. BURKHART 2,628,346

MAGNETIC TAPE ERROR CONTROL

Filed Nov. 3, 1951

INVENTOR
WILLIAM H. BURKHART
BY William P. Slovin

AGENT

Patented Feb. 10, 1953 2,628,346

UNITED STATES PATENT OFFICE 2,628,346

MAGNETIC TAPE ERROR CONTROL

William H. Burkhart, East Orange, N. J., assignor to Monroe Calculating Machine Company, Orange, N. J., a corporation of Delaware Application November 3, 1951, Serial No. 254,770

10 Claims. (Cl. 340—174)

This invention relates to magnetic recording in general and more particularly to a method of and means for maintaining a high degree of reproduction accuracy in magnetic tape recording systems.

Magnetic tape has been widely used in electronic computers and the like for purposes of storing coded information thereon in the form of magnetized spots. Magnetic tape, however, in addition to being costly, has certain undesirable properties. Probably the most important of these properties is that magnetic tape usually is not magnetically uniform throughout its length with the result that certain portions thereof either cannot be magnetized at all, or at least not sufficiently to effect generation of the required signal in reproducing operations. A second objectionable property of magnetic tape is that, upon repeated usage, previously satisfactory portions thereof become unusable magnetically.

It will readily be understood that in electronic computers and the like wherein the entry of an erroneous bit of information, or the failure to enter a bit of information, will greatly affect the accuracy of a computation, great care must be taken to insure that information transmitted to a magnetic tape actually is recorded thereon, and that said recording remains capable of generating a reproduction signal of the required magnitude.

The principal object of the invention, therefore, is the provision of a method of, and means for maintaining a high degree of reproduction accuracy in magnetic recording systems.

According to this invention, a magnetic tape is theoretically divided into a plurality of channels or tracks extending longitudinally thereof. Each said track is provided with recording and reproducing means which are spaced apart, relative to those of the other channels, not only laterally of the tape but also longitudinally thereof. The recording devices are interconnected in such manner that each item of information is recorded in all channels simultaneously. The reproducing devices are connected for simultaneous operation and control an output circuit in such manner that signals produced by the latter are indicative not of what all of the reproducing devices sense, but rather of what a majority of them sense. Obviously, this arrangement will provide a correct output signal in all instances wherein less than a majority of the simultaneously sensed tape areas are defective with respect to being magnetized or to retaining magnetization. This, of course, greatly increases the reproduction accuracy of the tape.

Also, in order to maintain a record of the number of defective tape areas and thus to provide a means for determining the time at which the tape should be replaced, all of the reproducing devices are connected to a comparison circuit which advances a counter one unit for each non-comparison found.

Obviously this further increases the reproduction accuracy of a magnetic tape.

Other objects and features of the invention will become apparent from the following description when read in the light of the drawings of which:

Figures 1, 2, 3:
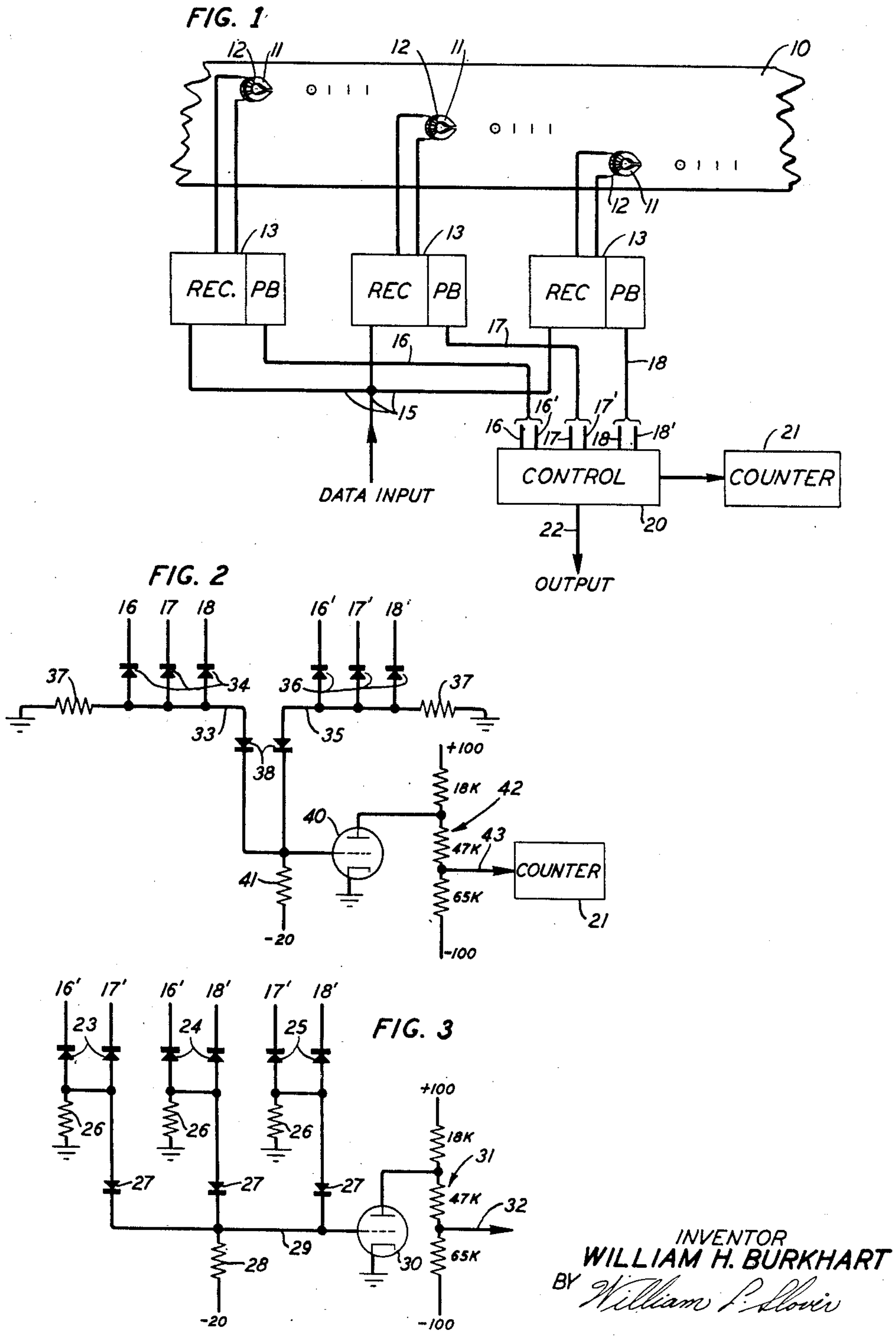
Fig. 1 is a schematic view illustrating a specific embodiment of the method and means of the invention.
Fig. 2 is a writing diagram of the comparison circuit of the invention.
Fig. 3 is a schematic wiring diagram of the majority signal determining means.

Referring to Fig. 1, the reference numeral 10 indicates a magnetic tape which may be of any sort adapted to receive spot magnetizations. According to the invention, the tape is divided laterally into a plurality of longitudinal tracks or channels, three such channels being indicated in Fig. 1 by the numerals 0111 which, it will be noted, represent the digit 7 in the coded decimal (1, 2, 4, 8) system of notation. Associated with each channel of tape 10 is a recording and reproducing head 11 having a coil 12. These heads 11 are, of course, aligned with their respective tape channels but are offset from one another longitudinally of the tape. The purpose of thus offsetting the heads is to guard against the possibility of more than one of them operating on a defective section of the tape at any given time. By "defective section of the tape" is meant a small area thereof which either cannot be magnetized at all, or, at least not sufficiently to effect generation of a required reproduction signal. It will readily be seen that the probability of two defective tape sections being aligned with a pair of the heads 11 simultaneously is very slim.

Each head 11 is driven by a combined recording and reproducing circuit 13 which may be of any suitable sort. The recording portions of the three such circuits are driven from a common source by information transmitted over lines 15, and, for purposes of description, may be considered as magnetizing discrete areas of the tape to indicate binary ones, binary zeros being indicated by unmagnetized areas. However, if desired, the record circuit may be arranged to magnetize said areas with opposite polarities of which one indicates binary one and the other, zero.

The invention thus far described, therefore, contemplates the recording of each item of information in a plurality of longitudinally and laterally spaced sections of a magnetic tape.

The playback or reproducing portion of each of the units 13 is driven by the associated head 11 and coil 12, and its output is applied over a pair of lines 16, 17 or 18 to a control unit 20 from which two outputs are taken, one to drive a counter 21, and the other, which is indicated at 22, to transmit the reproduced information to a utilization device. Counter 21 may be of any suitable sort. The recording portions of the units 13 also may be of any suitable sort which provides dual outputs that are alternately high and low. For example, each playback circuit may include a trigger pair having two outputs, as shown in the copending application of William H. Burkhart, Ser. No. 228,148.

Playback output lines 16, 17 and 18 are shown in dual form at the input of control unit 20 in Fig. 1 and also in Figs. 2 and 3, and one conductor of each line is designated by the same reference character as the line and the other by that reference character primed, i. e., 16 and 16′. For convenience of description, the sensing of a magnetized spot indicative of binary 1 by a head 11 may be assumed to effect the application of a high potential, say 0 volts, to the associated playback output conductor 16, 17 or 18 and the application of a low potential, say —20 volts, to the associated playback output conductor 16′, 17′, or 18′.

The second step in the method of the invention consists in transmitting to a utilization device a code signal indicative of the sensing of a majority of the reproducing heads 11 at a given sensing time. A means to this end is shown in Fig. 3 and comprises a pair of crystal rectifiers 23 to which the playback output lines 16′ and 17′ described above are applied, a pair of rectifiers 24 to which lines 16′ and 18′ are applied and a pair of rectifiers 25 to which lines 17′ and 18′ are applied. Obviously, these rectifier pairs represent the three possible conditions of lines 16′, 17′ and 18′, in forming a majority of the sensings of reproducing heads 11, that is, each pair represents an agreement between the output lines associated with two of said heads. Each rectifier pair is connected by a resistor 26 to ground and also to a rectifier 27 having the opposite polarity thereto. The three rectifiers 27 are connected to a source of —20 volts through a resistor 28 and a line 29 which is also connected to a grid of a triode 30. The cathode of triode 30 is connected to ground and its anode is connected to the juncture of the two positivemost sections of a three section voltage divider 31 which is applied across sources of +100 and —100 volt potentials and which has a center tap output line 32 leading to some utilization device. For purposes of description it will be assumed that the resistance values of the divider sections are such that output line 32 assumes a potential of zero volts, when the tube is cut off and a potential of —20 volts when the tube conducts.

In operation, the application of low potentials to, say, lines 16′ and 17′ to indicate binary one allows current to flow through both of the associated rectifiers 23 and a low potential is applied to the associated rectifier 27. Thus, no current flows through said rectifier 27. Rectifiers 24 to which lines 16′ and 18′ are applied may both pass current, or possibly only one will pass current. The former event is brought about by a low potential on line 18′ and the latter by a high potential on said line, this latter indicating that the reproducing head 11 associated with line 18′ did not sense the same thing as the other reproducing heads. In either event, a low potential is applied to the associated rectifier 27 and prevents current flow in resistor 28. The same condition as just described exists for the rectifiers 25, and the rectifier 27 associated therewith does not pass current either. Therefore, the potential of line 29 remains at the —20 volt level and tube 30 does not conduct. This applies a high potential of 0 volts to output line 32 to indicate a binary one. When two or more of the heads 11 sense binary zeros, high potentials of zero volts are applied to the associated playback circuit output lines 16′, 17′ and 18′. High potentials on, say, lines 16′ and 17′ effectively prevent current flow through the rectifiers 23 (Fig. 2) and a high potential is applied to the associated reversely connected rectifier 27. This permits current flow through said rectifier and the resultant rise in potential of line 29 effects conduction of tube 30. Therefore, the potential of output line 32 is reduced to —20 volts to indicate binary zero. It will readily be seen that the condition of the third line 18′ is of no consequence and that its effect on rectifiers 24 or 25 does not alter the described operation.

A third step in the method of the invention is to compare the reproductions of the plurality of supposedly alike information units located on the tape and to advance a counter one step for each non-comparison that is observed. The means for accomplishing this will now be described.

Control unit 20 produces an output pulse to advance counter 21 each time a non-comparison occurs between the outputs of the playback portions of the units 13. Means to this end are shown in Fig. 2. The playback circuit output conductors 16, 17 and 18 which are assumed to be high for a binary one input to the associated playback circuits from coil 12 are connected to a line 33 through crystal rectifiers 34. Output conductors, 16′, 17′ and 18′, which are assumed to be low for a binary one input to their units from coils 12, are connected to a line 35 through crystal rectifiers 36. Lines 33 and 35 are connected each, through a resistor 37, to ground, and also, through crystal rectifiers 38 of reverse polarity to rectifiers 34 and 36, to the grid of a triode 40, said grid also being connected through a resistor 41 to a source of negative potential, say, —20 volts. The cathode of the triode is grounded and the anode thereof is connected to the juncture of the two positivemost sections of a three section voltage divider 42 which is identical with that described above and has an output line 43 connected to the input of counter 21. The comparison circuit operates as follows:

When the reproducing heads 11 all sense a magnetized spot which represents a binary digit one, for example, the conductors, 16, 17 and 18 (Fig. 2) have applied thereto a high potential of 0 volts; and conductors 16′, 17′ and 18′ have a low potential of —20 volts applied thereto. The application of high potentials of 0 volts to the crystal rectifiers 34 is ineffective, that is, it does not cause current to flow. The potential of line 33, therefore, may be considered as being substantially 0 volts. However, the application of low potentials to conductors 16', 17' and 18' effects current flow through the rectifiers 36 and reduces the potential of line 35 to something like —20 volts. Therefore, one of the rectifiers 38 has a high potential applied thereto by line 33, while the other has a low potential applied thereto through line 35. In the opposite direction, these rectifiers are connected through resistor 41 to a source of —20 volts potential so that the rectifier associated with line 33 conducts and current flows through said resistor 41. This brings the potential of the grid of triode 40 to approximately 0 volts and the latter conducts. This, in turn, lowers the potential of counter input line 43 to —20 volts and counter 21 is not advanced. Obviously this same condition exists with the potentials of conductors 16, 17 and 18 and 16', 17' and 18' reversed. However, should one of the reproducing heads 11 sense something other than that which the other two sense, then one of the conductors 16, 17 or 18, say 18, will have, for example, a low potential applied thereto, while the conductors 16 and 17 have a high potential applied thereto; and conductor 18' will be high while conductors 16' and 17' are low. This condition allows current to flow in both lines 33 and 35 so that low potentials of approximately —20 volts are applied to both rectifiers 38 and prevent current flow through resistor 41. As a result, the low potential of —20 volts is applied to the grid of tube 40 and the latter is cut off. This raises the potential of counter input line 43 to 0 volts and counter 21 is advanced to register one unit.

It will be understood that, if desired, the method and means of the invention may be limited to the first two steps of the former and the means for carrying them out, the step of comparing the plurality of reproductions, and the circuit for accomplishing such comparisons, not being required in instances wherein the useful life span of a tape is determined in some other manner. Further, the crystal rectifier type comparison circuit illustrated and described is by way of example only, and may be replaced by any other suitable comparison circuit, for example, one embodying two three way vacuum tube "or gates" and a vacuum tube coincidence gate controlled by the outputs thereof and in turn controlling the triode 40. Suitable gates of these types are shown in the Burkhart application cited above.

The majority determining circuit of Fig. 3 may also be modified to include vacuum tube gates of the types discussed, or other known circuit elements in place of the rectifiers illustrated and described.

It will also be understood that whereas in the described instance of the invention information is simultaneously recorded in three different locations on a tape, it may be simultaneously recorded in any desired number of different locations in excess of two.

While there have been above described a limited number of embodiments of the invention, it is to be understood that many modifications and changes can be made therein without departing from the spirit of the invention, and it is not desired, therefore, to limit the scope of the invention except as set forth in the appended claims or as dictated by the prior art.

I claim:

1. The method of maintaining a high degree of reproduction accuracy in magnetic spot recording systems, which consists of simultaneously recording each item of information in a plurality of longitudinally and laterally spaced portions of a magnetic storage medium, simultaneously sensing the said spaced portions of the recording medium, transmitting to a utilization device a signal indicative of the information sensed in a plurality of the said spaced portions of the medium, comparing said sensings, and advancing an indicator on the occurrence of each non-comparison.

2. The method of maintaining a high degree of reproduction accuracy in magnetic spot recording systems, which consists of simultaneously recording each item of information in a plurality of longitudinally and laterally spaced portions of a magnetic storage medium, simultaneously sensing the plurality of supposedly alike information units and transmitting to a utilization device a signal indicative of the information sensed in a majority of the said spaced portions of the medium.

3. In a magnetic spot recording system wherein information is recorded on a movable magnetic storage medium, the combination of a plurality of record circuits associated with said medium and adapted to simultaneously record the same information in a plurality of longitudinally and laterally spaced portions thereof, a plurality of playback circuits associated with the said medium and adapted to be driven simultaneously by the several recordings of each information item, and a circuit controlled by all of said playback circuits to produce a signal indicative of that produced by a majority of the playback circuits.

4. In a magnetic spot recording system wherein information is recorded on a movable magnetic storage medium, the combination of a plurality of record circuits associated with said medium and adapted to simultaneously record the same information in a plurality of longitudinally and laterally spaced portions thereof, a plurality of playback circuits associated with the said medium and adapted to be driven simultaneously by the several recordings of each information item, a majority circuit driven by all of the playback circuits and adapted to produce an output signal indicative of that produced by a majority of the playback circuits, a comparison circuit adapted to produce a desired output on the occurrence of a non-comparison between the outputs of the several playback circuits, and an indicator advanced by said desired output.

5. In a magnetic spot recording system wherein information is recorded on a moving magnetic storage medium, the combination of a plurality of recording units associated with the storage medium and operated simultaneously to record each item of information in a plurality of longitudinally and laterally spaced portions of said medium, a like plurality of playback units associated with said medium for simultaneous operation by the several recordings of each information item, a comparison circuit driven by all of the record circuits to compare the outputs thereof, an indicator advanced by said comparison circuit on the occurrence of a non-comparison between the outputs of the playback circuits, and a majority determining circuit driven by all of said playback units and adapted to produce an output signal indicative of the output signals of a majority of the playback units.

6. In a magnetic spot recording system wherein information is recorded on a movable magnetic storage medium, the combination of a plurality of recording units associated with said medium and operated simultaneously to record each item of information in a plurality of longitudinally and laterally spaced portions thereof, a like plurality of playback units associated with the said medium and driven simultaneously by the several recordings of each information item, the outputs of said playback circuits being grouped to form all the possible majorities thereof, a coincidence circuit driven by each group, and a signal producer driven by whichever of said coincidence circuits is effective at a given time.

7. In a magnetic spot recording system wherein information is recorded on a movable magnetic storage medium, the combination of a plurality of recording units associated with said medium and operated simultaneously to record each item of information in a plurality of longitudinally and laterally spaced portions thereof, a like plurality of playback units associated with the said medium and driven simultaneously by the several recordings of each information item, to either of two states, means controlled by the playback units for determining the state in which a majority of said playback units stand in response to each sensing, and a signal producer controlled by said means.

8. In a magnetic spot recording system wherein information is recorded on a movable magnetic storage medium, the combination of a plurality of recording units associated with said medium and operated simultaneously to record each item of information in a plurality of longitudinally and laterally spaced portions thereof, a like plurality of playback units associated with the said medium and driven simultaneously by the several recordings of each information item to either of two states, means controlled by the playback units for determining the state in which a majority of said playback units stand in response to each sensing, a signal producer controlled by said means, a comparison circuit controlled by said playback units, and an indicator advanced by said comparison circuit each time all of the playback units are not in the same state.

9. In a magnetic spot recording system wherein information is recorded in a movable magnetic storage medium, the combination of $n$ recording units associated with said medium and operated simultaneously to record each item of information in $n$ longitudinally and laterally spaced portions thereof, $n$ playback units associated with said medium and driven simultaneously by the $n$ recordings of each information item to one of two states, means for determining the state in which at least $$\frac{n}{2}+1$$

of said playback units stand in response to each sensing, and a signal producer controlled by said means.

10. In a magnetic spot recording system wherein information is recorded in a movable magnetic storage medium, the combination of $n$ recording units associated with said medium and operated simultaneously to record each item of information in $n$ longitudinally and laterally spaced portions thereof, $n$ playback units associated with said medium and driven simultaneously by the $n$ recordings of each information item to one of two states, means for determining the state in which at least $$\frac{n}{2}+1$$

of said playback units stand in response to each sensing, a signal producer controlled by said means, a comparison circuit controlled by said playback units, and an indicator advanced by said comparison circuit each time all $n$ playback units are not in the same state.

WILLIAM H. BURKHART.

REFERENCES CITED

The following references are of record in the file of this patent:

UNITED STATES PATENTS

| Number | Name | Date |
|---|---|---|
| 2,394,990 | Eisler | Feb. 19, 1946 |
| 2,424,773 | Rieber | July 29, 1947 |
| 2,427,421 | Rieber | Sept. 16, 1947 |
| 2,512,038 | Potts | June 20, 1950 |
| 2,547,011 | Jacobsen | Apr. 3, 1951 |
| 2,589,465 | Weiner | Mar. 18, 1952 |